United States Patent
Lewis et al.

(10) Patent No.: US 10,924,441 B1
(45) Date of Patent: Feb. 16, 2021

(54) DYNAMICALLY GENERATING VIDEO CONTEXT

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

(*) Notice: Subject to any disclaimer, the term of this patent is extended or adjusted under 35 U.S.C. 154(b) by 923 days.

(21) Appl. No.: 14/838,201

(22) Filed: Aug. 27, 2015

Related U.S. Application Data

(60) Provisional application No. 62/050,057, filed on Sep. 12, 2014.

(51) Int. Cl.
*H04L 12/58* (2006.01)
*G06F 16/955* (2019.01)

(52) U.S. Cl.
CPC .......... *H04L 51/18* (2013.01); *G06F 16/9566* (2019.01)

(58) Field of Classification Search
CPC . H04L 51/18; G06F 17/30887; G06F 16/9566
USPC ........................................................ 709/206
See application file for complete search history.

(56) References Cited

U.S. PATENT DOCUMENTS

| | | | | |
|---|---|---|---|---|
| 8,166,383 B1* | 4/2012 | Everingham | ......... | G06F 17/241 707/627 |
| 8,353,012 B2* | 1/2013 | Del Real | ............. | G06F 21/6218 705/326 |
| 8,538,790 B2* | 9/2013 | Nickerson | .............. | G06Q 10/10 705/7.11 |
| 8,725,816 B2* | 5/2014 | Lee | ......... | G06Q 50/01 709/204 |
| 9,503,509 B1* | 11/2016 | Hunt | ....................... | H04L 67/10 |
| 2009/0198775 A1* | 8/2009 | Keinan | .................. | G06Q 10/06 709/205 |
| 2011/0191849 A1* | 8/2011 | Jayaraman | .......... | H04L 63/1416 726/23 |
| 2015/0039694 A1* | 2/2015 | Yoon | ................... | H04L 12/1813 709/204 |
| 2015/0074560 A1* | 3/2015 | Conley | .................. | G06Q 50/01 715/758 |

* cited by examiner

*Primary Examiner* — Umar Cheema
*Assistant Examiner* — John Fan
(74) *Attorney, Agent, or Firm* — Lowenstein Sandler LLP

(57) ABSTRACT

A computer-implemented method for modifying the presentation of URL included in a comment is provided herein. Implementations of the method include receiving a comment of a user of a first content-sharing platform. The comment is associated with a media item and includes a uniform resource locator (URL). Implementations of the method further include determining a context in which the comment is to be rendered and modifying presentation of the URL based on the determined context and the URL.

13 Claims, 6 Drawing Sheets

DYNAMICALLY GENERATING VIDEO CONTEXT

RELATED APPLICATION

This patent application claims the benefit under 35 U.S.C. § 119(e) of U.S. Provisional Application No. 62/050,057, filed Sep. 12, 2014, which is herein incorporated by reference.

BACKGROUND

On the Internet, content-sharing platforms and content-distribution platforms, like social networks, subscription media services, and others, allow users to consume a variety of media items and may allow users to connect to and share information and media items with each other. Many social networks include a content-sharing aspect that allows users to upload, view, and share content, such as video content, image content, audio content, and so on (which may be referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, wearable computers, and tablet computers) to access the content-sharing and distribution platforms to use, play, share, and/or consume media items (e.g., watch digital videos, and/or listen to digital music).

In order to improve the experience of users of content-sharing and distribution platforms and to increase user engagement, many such platforms allow users to comment on specific media items. For example, a first user may comment on a media item to express enthusiasm, disdain, annoyance, humor, etc. This comment may then be presented to other users, who may in turn make their own comments. The "dialogue" provided by the comments of various users may increase user engagement with the media items made available by a given platform and among the community of users.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular implementations of the disclosure or any scope of the claims. Its sole purpose is to present some concepts of the disclosure in a simplified form as a prelude to the more detailed description that is presented later.

A computer-implemented method for modifying the presentation of URL included in a comment is provided herein. Implementations of the method include receiving a comment of a user of a first content-sharing platform. The comment is associated with a media item and includes a uniform resource locator (URL). Implementations of the method further include determining a context in which the comment is to be rendered and modifying presentation of the URL based on the determined context and the URL.

Implementations can include any, all, or none of the following features. Determining the context may, for example, include determining whether the comment is to be rendered in a comment thread on a watch user interface (UI) of the media item. The context in which the comment is to be rendered in some implementations may include a comment thread on a second content-sharing platform. Some implementations may include transmitting instructions for the modified presentation of the URL to a client device. The method may also include requesting the comment from the first content sharing platform. The media item may also be hosted, for example, on the second content-sharing platform.

Modifying presentation of the URL can include identifying a timestamp portion of the URL. The method can further include converting the timestamp portion of the URL into a time presentation format. In another example, modifying presentation of the URL may also include removing information from the URL that is redundant in view of the context. In some implementations the URL may identify a derivative media file. Modifying the presentation of the URL may further include, for example, displaying a thumbnail image associated with the derivative media file in place of the URL in the comment.

In additional implementations, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the present disclosure, a non-transitory computer-readable storage medium stores instructions for performing the operations of the above-described implementations.

BRIEF DESCRIPTION OF THE DRAWINGS

Aspects of the present disclosure are illustrated, by way of example and not by way of limitation, in the figures of the accompanying drawings.

Figure 1:
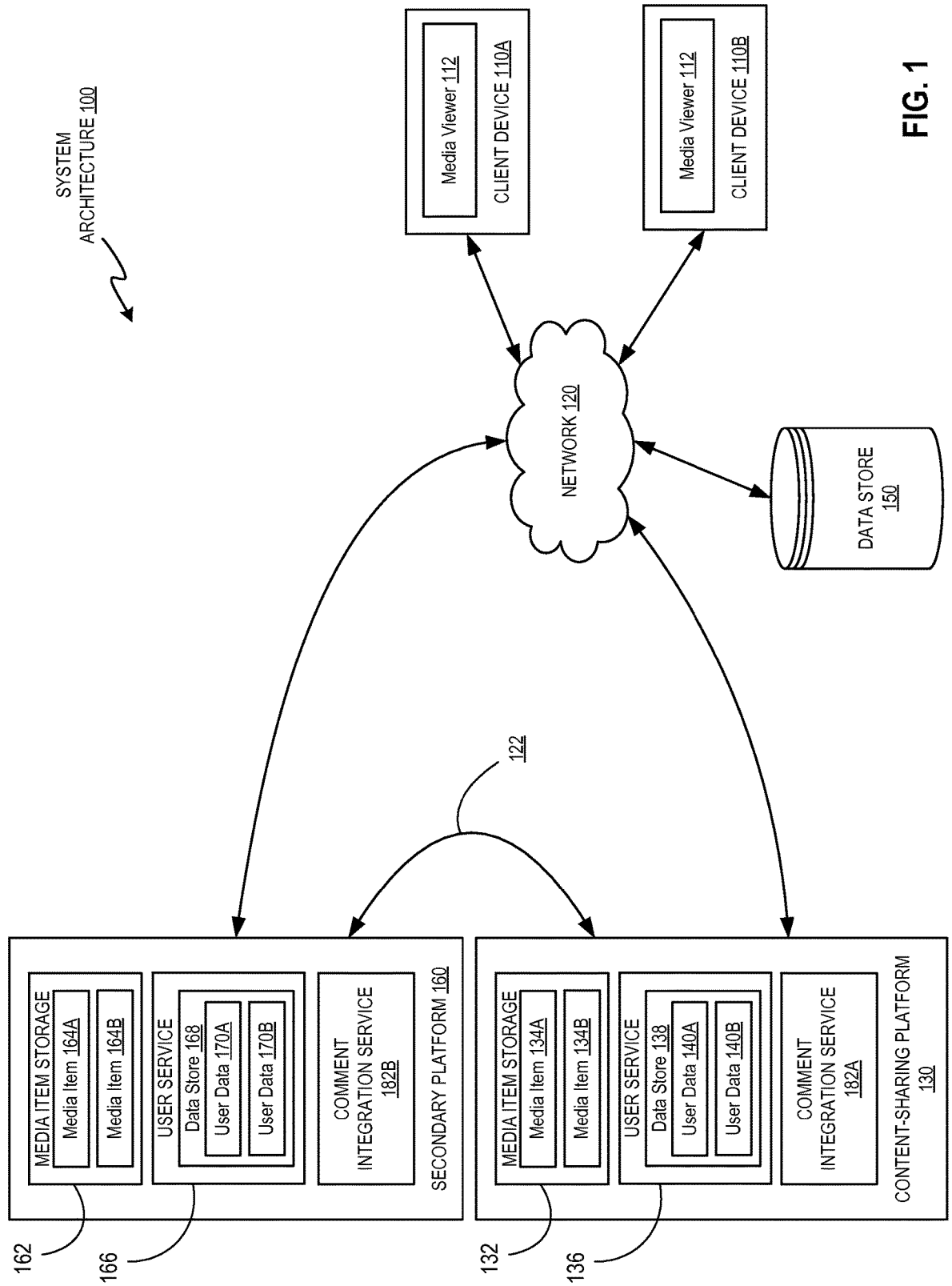
FIG. 1 illustrates an example of a system architecture for integrating comments from one platform with another platform, in accordance with an implementation of the disclosure.

These drawing may be better understood when observed in connection with the following Detailed Description.

DETAILED DESCRIPTION

Implementations are described for dynamically generating and rendering extra context in a comment associated with a particular media item made accessible by a media platform. Internet-based media platforms have become increasingly important channels for the distribution and consumption of media content such as movies, television, videos, music, photography, and text. As more media distribution has migrated onto such platforms, the amount of content available has increased dramatically. These Internet-based media platforms may include platforms that permit ordinary users to upload media items (referred to herein as content-sharing platforms) and platforms in which ordinary users merely consume media items (referred to herein as content-distribution or content-presentation platforms). These different types of platforms are not mutually exclusive, but may instead represent an area of focus of a given platform. While the examples of this disclosure are expressed as being directed to content-sharing platforms, the principles and scope are applicable in other media platforms (e.g., Internet-based, smart TV, game console, distribution platforms, etc.) as well.

Media items that may be consumed via a content-sharing platform may include videos, digital photos, music, etc. Such media items may be combined on some platforms. On some content-sharing platforms, user may be provided tools, such as settings, whereby a user may limit access to a shared media item to a subset of the users of that platform. Thus, a user may be able to share a media item with as many as all of the users of a content-sharing platform or as few as a single user of that platform.

To increase user-engagement with a content-sharing platform, comment threads or social threads may be supported by the platform. These threads present comments made by users in connection with a particular media item presented on the platform. Thus, upon or while consuming a media item shared by an uploading user, a consuming user may be able to enter a comment that is associated with the media item. When other users consume the media item, the comment may be presented to them in connection with the presentation of the media item. For example, a watch user interface (watch UI) (e.g., a watch page) for an uploaded video may present the video in a media player and further include a comments section or thread that displays at least some of the comments associated with the uploaded video. Comments may enable discussion among users of the content-sharing platform. While this discussion may be topically centered on the media item with which it is associated, not all comments may focus solely on the media item, but may refer to other subjects such as a different media item.

Given the variety of content-sharing platforms, some platforms provide features and focus to a given area of social sharing (e.g., digital images or digital video), while another platform may be focused on text-based communications among the platforms users. Because some platforms may be better suited or more focused (or perceived by users to be better suited or more focused) on a specific aspects or set of aspects of social sharing, information from one platform may be shared on another platform. For example, a user may include a link to a video hosted on a video platform in a social post, such as a status update, on different platform. In some instances, both platforms may be operated jointly, but in other instances the platforms may be operated separately. Where comments are shared between two platforms (e.g., signals of approval of a music track on a streaming music service may be displayed on a social network when the user has linked the accounts), some of the content of the comment may be rendered redundant by the context of one of the platforms.

In order to share media items across platforms, users may include uniform resource locators (URLs) or other links in comments on a first platform. In some implementations, if a user would like to comment about a particular moment in a video on a first platform and to post this comment for presentation on a second platform, the comment may include a URL having the location of the video (e.g., the website name such as http://xxxxx.com), an identifier of the video (video ID) and the timestamp corresponding to the particular moment in the video. When the comment including the URL is provided to the second platform, the URL may include redundant information if the video is hosted by the second platform and the comment is to be presented in a watch UI of the video (e.g., a watch page of the video). In such circumstances, the URL may be modified (by the first platform or by the second platform) prior to presentation on the second platform. The modifications may remove redundant portions of the information. The modified URL may be displayed as a link that provides access to the resource identified by the URL, and may have a cleaner, simpler presentation that provides a better visual environment for users of the second platform. Specifically, rather than presenting the comment with the entire URL including location of the video, the video ID and the timestamp, the comment may simply include a human readable timestamp identifying the specific moment in the video to which the comment pertains. This timestamp may be selectable (e.g., a clickable link) to allow a viewer to skip to the desired moment in the video. For example, a URL such as "http://csp.co/9bZkp7q19f0?t=7m07s" may be presented as a link appearing as "7:07." Thus, the information "?t=7m07s" from the URL may be preserved, and formatted in a conventional time presentation format (e.g., "hours:minutes:second," hours:minutes," or "minutes:seconds") with which users may feel more comfortable.

In some implementations, if a user would like to comment about a video from a playlist on a first platform and to post this comment for presentation on a second platform, the comment may include a URL having the location of the video (e.g., the website name such as http://xxxxx.com), an identifier of the video (video ID), an identifier of the playlist (playlist ID) and the index of the video (the position of the video in the playlist). An example URL can be https://csp.co/9bZkp7q1&list=abcd9&index=1. When the comment including the URL is provided to the second platform, the URL may include redundant information if the video is hosted by the second platform and the comment is to be presented in a watch UI of the video (e.g., a watch page of the video). In such circumstances, the URL may be modified (by the first platform or by the second platform) prior to presentation on the second platform. The modifications may remove redundant portions of the information. That is, rather than presenting the comment with the URL including location of the video, the video ID, the playlist ID and the video index, the URL may be removed from the comment, and instead a visual representation of the playlist can be presented with the comment. For example, a selectable label (e.g., in light grey text) can be presented at the top of the comment, and when the user hovers over the label, its appearance may change (top a different color) to show that it can be clicked on or otherwise selected. When selected, the playlist can be brought up beside the video (e.g., using soft UI transition instead of refreshing the entire UI).

In some implementations, the presentation of the URL may be modified to be or to include a visual image, such as an image from a video, an image representing a playlist, or a derivative media file such as graphics interchange format (GIF) file (i.e., a GIF). The modifications can be included in instructions sent from the content-sharing platform to a user's client device, which then renders the instructions to display the comment, with the modified presentation of the URL, to the user.

If the comment presented in a watch UI of a video pertains to a different video (not the one presented in the media player of the watch UI), the comment may be presented with the original (unmodified) URL to provide sufficient context for the comment (the location and identifier of the actual video to which the comment pertains).

These and other implementations may improve the accessibility and appearance of content-sharing platforms, by modifying the presentation of a URL in a comment according to the content of the URL and the context in which the URL is to be presented.

The present disclosure often references videos for simplicity and brevity. However, the teaching of the present disclosure are applied to media item instances generally and can be applied to various types of content or media item instances, including for example, video, audio, text, images, program instructions, etc.

FIG. 1 illustrates an example of a system architecture 100 for the sharing, distributing, and presenting of media items, in accordance with an implementation of the disclosure. The system architecture 100 includes a plurality of client devices, illustrated as examples of client devices 110A and 110B. The system architecture 100 further includes a network 120, a content-sharing platform 130, and a data store 150. The system architecture 100 also includes a second content-sharing platform 160, referred to herein as a secondary platform 160. The content-sharing platform 130 and the secondary platform 160 may have many features in common. For example, both the content-sharing platform 130 and the secondary platform 160 may permit users to share one or more media items with other users of the respective platform. The content-sharing platform 130 and the secondary platform 160 are described in more detail elsewhere in present disclosure.

In one implementation, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In an implementation, the data store 150 includes a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center. Thus, in some implementations, the data store 150 may be a data center.

In one implementation, the client devices 110A and 110B may include computing devices such as personal computers (PCs), laptops, smartphones, tablet computers, wearable computing devices, etc. Client devices 110A and 110B may share many features, such that descriptions herein of the client device 110A may apply equally to client device 110B. Client devices 110A and 110B may be used to consume (e.g., view, hear, etc.) content from the content-sharing platform 130 and/or the secondary platform 160 and to provide content to either or both platforms 130 and 160. For example, a user may use client device 110A to upload content that is created on or obtained by the client device 110A, such as an image or a video, to the content-sharing platform 130. Additionally, the client 110A may be employed by a user in creating content directly on the content-sharing platform 130 and/or the secondary platform 160.

For example, a user may use the client device 110A to create a social post on the secondary platform 160. The social post may include one or more of a text-based message, a still image, a derivative media file, a video, an audio clip, or combinations thereof. In some instances herein, client devices 110A and 110B may also be referred to as "user devices."

Each client device 110A and 110B, and other client devices present in implementations of the system architecture 100, includes a media viewer 112. In one implementation, the media viewers 112 may be applications that allow users to receive media items including visible content, such as images, videos, web pages, text, documents, etc., and/or audio content from the platforms 130 and 160. For example, the media viewer 112 may be a web browser that can access, retrieve, present, and/or navigate content (e.g., web pages such as Hyper Text Markup Language (HTML) pages, digital media items, etc.) served by a web server. The content may be received as a set of instructions or data. The media viewer 112 may render, display, and/or present the content (e.g., a web page, a media viewer) from the received instructions on the client device to a user consuming the content. The media viewer 112 may also display an embedded media player (e.g., a Flash® player or an HTML5 player) that is embedded in a web page (e.g., a web page that may provide information about a product sold by an online merchant, a content-sharing platform such as a social network with social posts and comments). The media viewer 112 may also render or present audio components of the content on a sound system of a client device.

In another example, the media viewer 112 may be a standalone application, such as smartphone application or "app," that allows users to consume digital media items (e.g., digital videos, digital images, electronic books, shared text, etc.) as part of the content-sharing platform 130 or the secondary platform 160. Additionally, the media viewer 112 may provide a user interface, or receive instructions or data including a user interface from the content-sharing platform 130 or the secondary platform 160 to enable users to upload and manage content.

The media viewers 112 may be provided to the client devices 110A and 110B by the content-sharing platform 130, the secondary platform 160, and/or a third-party distribution platform, such as an app distribution platform. For example, the media viewers 112 may be embedded media players that are embedded in web pages provided by the content-sharing platform 130 over the network 120 to the client devices 110A and 110B. In another example, the media viewers 112 may be applications that are downloaded from a server accessible to the client devices 110A and 110B through the network 120 and then executed by a processing device of the client devices 110A and 110B.

In general, functions described in one implementation as being performed by the content-sharing platform 130 or secondary platform 160 can also be performed on the client devices 110A and 110B in other implementations if appropriate. Thus, the functionality attributed to a particular component of the system architecture 100 may be performed by different or multiple components operating together or by the particular component alone. The content-sharing platform 130 and the secondary platform 160 can also be accessed as a service provided to other systems or devices through appropriate application programming interfaces (APIs), and thus is not limited to use in particular websites or particular applications. For example, the content-sharing platform 130 may be able to access media items and/or user data provided by the secondary platform 160 through an API.

In some implementations, the content-sharing platform 130 and the secondary platform 160 may include one or more computing devices (such as a rack-mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The secondary platform 160 may provide its users a similar set of options and functions. The content-sharing platform 130 and the secondary platform 160 may also include a website (e.g., a web page) and/or a mobile computing application (e.g., an "app") that may be used to provide a user with access to the media items.

The content-sharing platform 130 may include a media item storage 132 that includes a plurality of media items, such as for example media items 134A and 134B. Examples of media items 134A and 134B can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, text-based messages, social posts, etc. As used herein, "media," media item," "online media item," "digital media," "digital media item," "content," and "content item" can include and refer to an electronic file that can be executed, loaded, or played using software, firmware, or hardware configured to present the digital media item to a viewing user of the content-sharing platform 130 or secondary platform 160.

The content-sharing platform 130 may further include a user service 136. The user service 136 may include a data store 138 that stores user data. As shown in FIG. 1, the data store 138 stores user data 140A and user data 140B. The user data 140A and 140B may include databases and/or table of information about or associated with users of the content-sharing platform, individually and/or collectively. The user service 136 may include consumption histories and/or playlists for the users of the content-sharing platform 130 and may include interactions, such as approvals, disapprovals, comments, re-postings, etc., that the users have had with one or more of media items 134A and 134B. The user service 136 may include a database of comments stored in the user data 140A and/or 140B. Comments may be stored in the database such that comments may be retrieved for a particular user or group of users and such that comments may be retrieved that are associated with a particular media item or URL.

The secondary platform 160 may include similar features, such as a media item storage 162 storing for example media items 164A and 164 and a user service 166. In one implementation, the user service 166 includes a data store 168 having user data 170A and 170B.

In some implementations, the platforms 130 and 160 may each have a focus with respect to a single type or set of types of media items. In many of the examples provided in this disclosure, the content-sharing platform 130 may be a video sharing platform that allows users to upload and to consume video media items. The secondary platform 160 may be a more general social network in which a default media item type is a text-based social post, but which may include other types of media items. While the description of the present disclosure is more generally applicable, these examples are provided for clarity of explanation.

In some implementations, the content-sharing platform 130 and the secondary platform 160 are managed and operated together by a single entity. In other implementations, the content-sharing platform 130 and the secondary platform 160 are operated separately by different entities. Using an application programming interface (API) provided by either of the platforms 130 and 160, a user may be able to link the user's account on the content-sharing platform 130 with the user's account on the secondary platform 160. Thus, whether operated jointly or separately, some information may be shared between content-sharing platform 130 and the secondary platform 160. For example, when the user enters a comment on the secondary platform 160 that comment may be provided to the content-sharing platform 130 by communication over the network 120.

The content-sharing platform 130 further includes a comment integration service 182A. As illustrated, the secondary platform 160 also includes a comment integration service 182B. The comment integration services 182A and 182B may request and/or retrieve comments from data stores 138 and 168. For example, the comment integration service 182A of the content-sharing platform 130 may request any comments stored in the data store 168 of the secondary platform 160 that are associated with a particular media item hosted by the content-sharing platform 130. The comment integration service 182A may communicate with the user service 166 over the network 120 via an API to request and receive the comment or comments.

When the comment integration service 182A receives a comment from the secondary platform 160, the comment integration service 182A may determine the context in which the comment is to be rendered. For example, the comment may be intended for rendering on a UI associated with a media item, such as a watch UI of a video. The comment integration service 182A may check the comment to determine whether it includes a URL and to determine whether the URL is associated with the media item. If the comment is to be rendered on a UI associated with a media item, such as a watch UI of the media item, and the comment includes a URL associated with the media item, the presentation of the URL may be modified by the comment integration service 182A. The presentation of the URL may be modified to include the URL as a link that is rendered as something other than the string of characters that make up URL.

As in the example provided above, if the URL "http://csp.co/9bZkp7q19f0?t=7m07s" is received by the comment integration service 182A, rather than simply presenting "http://csp.co/9bZkp7q19f0?t=7m07s" to users of the content-sharing platform 130, the URL may be presented as a link appearing as "7:07." This modification may be performed when the comment integration service 182A determines that the link is to be included in a comment displayed in connection with a web page, the URL of which is "http://csp.co/9bZkp7q19f0." In such an instance, a portion of the URL is redundant. Specifically, the "http://csp.co/9bZkp7q19f0" is redundant. The time stamp, formatted in this example of the URL as "?t=7m07s", may be modified for presentation in a time-presentation format as 7:07. The comment integration service 182A or another service provided by the content-sharing platform 130 may then transmit instructions for the presentation of the modified URL.

The presentation of a URL may be modified in different ways based on the context in which the URL is to be rendered and based on the URL itself. For example, the content-sharing platform 130 may provide "playlists" or collections of media items. A playlist can be referred to as a list of media items (e.g., video, audio, image, text, executable instructions, etc., or any combination of the above) that are automatically presented to a user one after another. When a URL that identifies a media item as being included in a playlist is included in a comment on the secondary platform 160 and that comment is requested by the content-sharing platform 130, the URL may be modified for presentation on a watch UI of the media item.

For example, a URL in a comment or social post on the secondary platform 160 may include a URL such as "http://csp.co/watch?v=ASO_zypdnsQ&list=RD9bZkp7q19f0&index=0." In this URL, certain portion may identify or be associated with certain features. For example, the portion "&list=RD9bZkp7q19f0" may identify one media item in a playlist indicated by the portion "ASO_zypdnsQ." The index portion "&index=0" may indicate how many times the media item identified by "&list=RD9bZkp7q19f0" is included in the playlist. When the comment integration service 182A modifies the presentation of the URL, the modified presentation may be "http://csp.co/watch?v=ASO_zypdnsQ," the portion that identifies the playlist.

In some implementations, a thumbnail image of the playlist may be included. The thumbnail image may be a composite image that includes several thumbnail images, each thumbnail image from one of several different videos included in the playlist. The several thumbnail images may not include a thumbnail image generated from the media item associated with the current watch UI.

In some implementations, the content-sharing platform 130 may include a tool or service for the creation of GIF files or other derivative media files from a media item by users of the content-sharing platform 130. The GIF file may be identified by a URL, such as "http://csp.co/gif?v=ASO_zypdnsQ&g=goCMKHQ6Z1A." If the GIF file is included in a comment on the secondary platform 160 that is pulled by the comment integration service 182A for inclusion in the comments section of the content-sharing platform 130, the presentation of the GIF file may be modified if the GIF file was created from the media item shown on the watch UI. Rather than include the text of the URL of the GIF, the URL may be presented as the GIF itself. Thus, the presentation of the URL is modified to replace the URL with the GIF.

As described above, the comment integration service 182A communicates with the secondary platform 160 through the network 120. In some implementations, a direct link 122 couples the content-sharing platform 130 with the secondary platform 160, bypassing the network 120. For example, the direct link 122 may be present when the content-sharing platform 130 and the secondary platform 160 are operated by the same entity. In some implementations, the request by the content-sharing platform 130 for comments related to a media item may be provided to the comment integration service 182B on the secondary platform 160, rather than to the comment integration service 182B. In such instances, the comment integration service 182B may provide instructions for the modified presentation of the URL to the content-sharing platform 130 as if it were the client device 110A. In some implementations, the comment integration service 182B may respond to requests for comments from the comment integration service 182A, which then modifies the presentation of URLs in comments as described herein.

In some implementations, the content-sharing platform 130 may store the media items 134A and 134B using the data store 150. In such implementations, the media items 134A and 134B may be pointers to corresponding media item files as stored in the data store 150. The media items 134A and 134B may be retrieved from data store 150 prior to delivery to one or more of client devices 110A and 110B over network 120. Pointers may be included in the user data 140A and 140B as part of a user's consumption history, or owned media item list, or another identifier may be used to indicate that a particular user has consumed a particular media item and/or owns the particular media item. In such an instance, the comment integration service 182A or 182B may request user data, including comments, from the data store 150.

Figure 2:
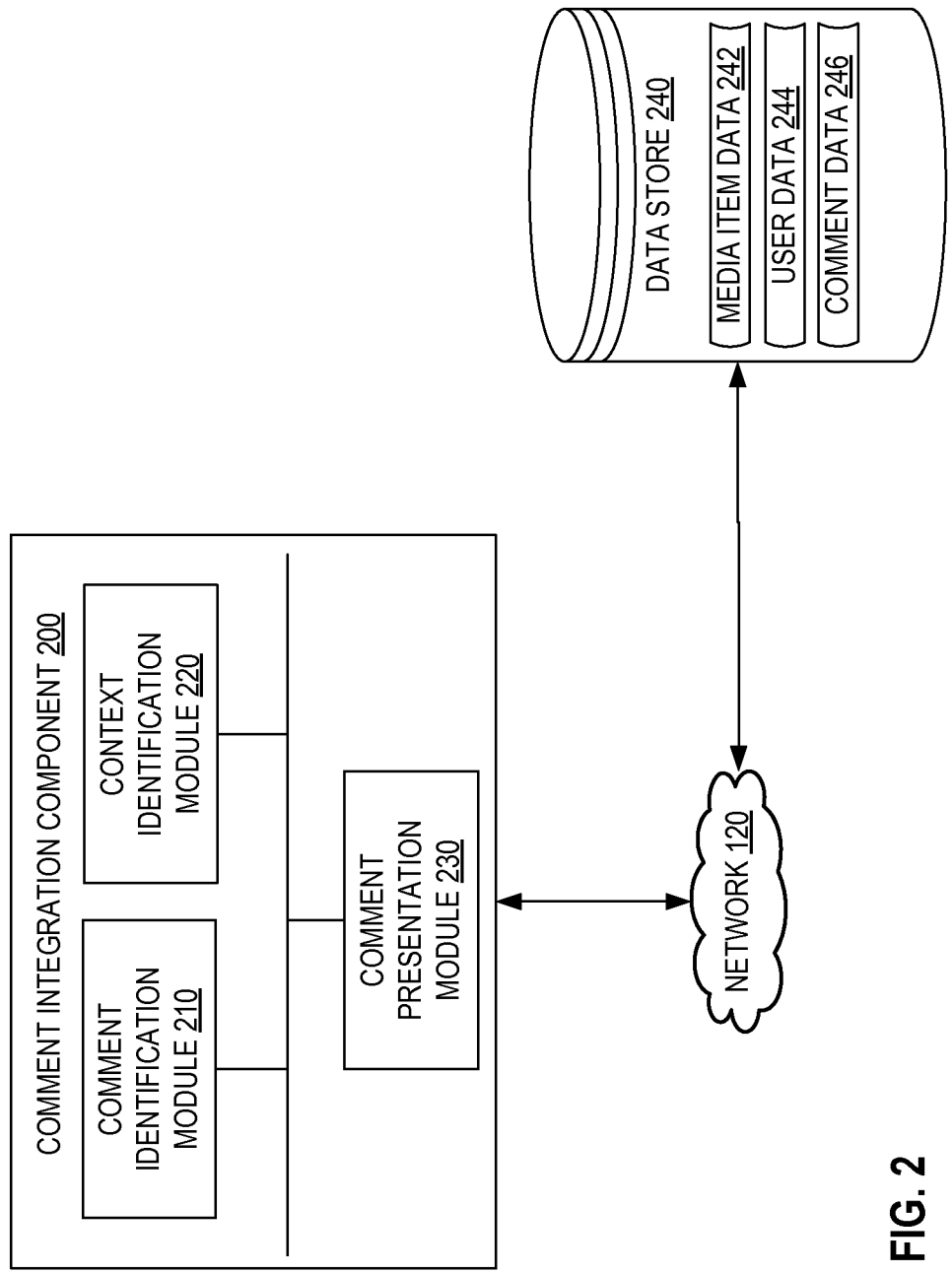
FIG. 2 is a block diagram of a comment integration component, in accordance with some implementations of the disclosure.

Referring to FIG. 2, shown therein is a block diagram of a comment integration component 200, such as to provide the comment integration services 182A and 182B. The comment integration component 200 may include a comment identification module 210, a context identification module 220, and a comment presentation module 230. The modules 210, 220, and 230 may work in cooperation to modify the presentation of URLs in comments to improve the display of related information to users of the content-sharing platform 130.

The comment identification module 210 may receive a request issued by the content-sharing platform 130 for comments made on the secondary platform 160. The request may include a media item identifier that identifies a media item. The media item identifier may be a string of characters including characters suitable for use in a URL. The comment identification module 210 may make a request for any comments associated with the media item identifier. For example, a comment that included a URL associated with a media item hosted by the content-sharing platform 130 may be identified by the secondary platform 160 and returned to the comment integration component 200. In some implementations, the comment identification module 210 may communicate with the data store 240 to identify associated comments. As illustrated, the data store 240 may include media item data 242, user data 244, and separate comment data 246. In some implementations, the data store 240 is included in the secondary platform 160, while in other implementations, the data store 240 is the data store 150 of FIG. 1.

The context identification module 220 may determine the context in which the comment is to be rendered. For example, if the comment is to be rendered on a watch UI associated with the media item, this context may render some portions of the URL redundant. The context identification module 220 may communicate the context (e.g., whether or not the comment including the URL is to be rendered in connection with a media item associated with or identified by the URL) to the comment presentation module 230. The context may be the platform on which the comment is to be presented or may be the specific watch UI in which the comment is to appear.

The comment presentation module 230 may also receive the URL from the comment identification module 210. Using the context and the URL, the comment presentation module 230 may modify the presentation of the URL by modifying instructions that direct the presentation of the URL by a client device, such as client devices 110A and 110B. Many different modifications may be performed. For example, portions of the URL that are redundant in view of the watch UI on which the comment is being integrated may be omitted. Remaining portions may be reformatted. For example, a URL including a timestamp portion may be presented as a formatted time (e.g. 6:11, 12:19, 1:23:30, etc.) when a comment including the URL is to be included on a watch UI of a media item identified by the URL. In other implementations, the presentation of the URL may be modified by replacing the URL with an image, a short clip, or a derivative media file such as a GIF file.

Figure 3A:
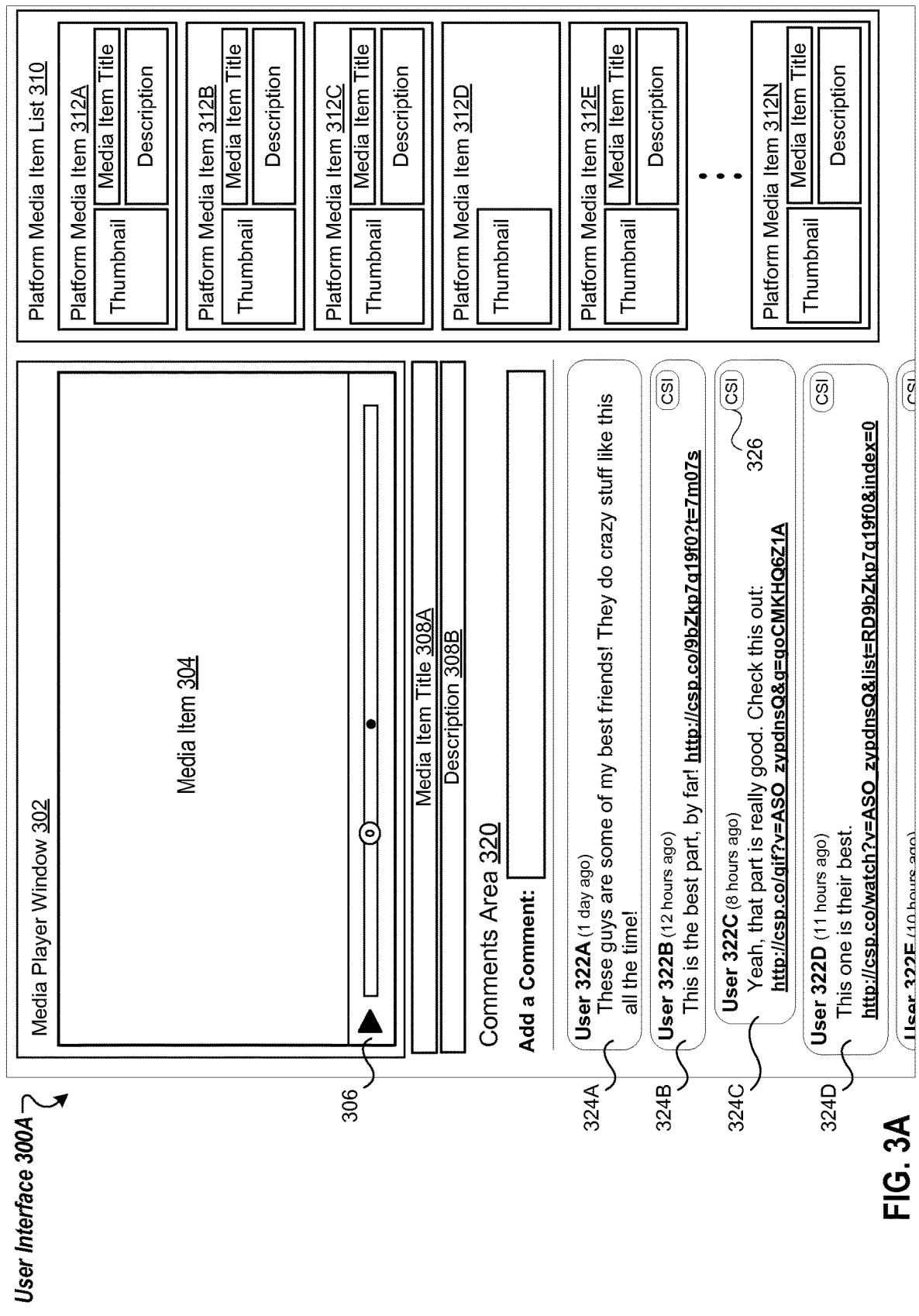
FIG. 3A is an example of a user interface of a content-sharing platform, according to some implementations of the disclosure.

FIG. 3A illustrates an implementation of auser interface 300A that may be provided by the content-sharing platform 130 as instructions to the client device 110A, which then renders the instructions on a display of the client device 110A. The user interface 300A includes a media player window 302 which presents a media item 304. The user interface 300A may be a watch UI associated with the media item 304. The media player window 302 includes a control section 306 that provides controls to a user of the content-sharing platform 130 to begin the playing or to stop the playing of the media item 304. The control section 306 may also include a timeline that indicates to the user a current position (i.e., time) in the playback of the media item 304. The timeline may further include indicators that communicate to the user where break points may be included in the play back of the media item 304. The media player window 302 may be included in the user interface 300A in connection with a media item title 308A for the media item 304 and a description 308B of the media item 304.

The user interface 300A may include a platform media item list 310 that displays several platform media items 312A-N. Each of the platform media items 312A-N may include a thumbnail image obtained from the corresponding media item, as well as a media item title and a description. The platform media item list 310 may be a feed produced by the content-sharing platform 130 for the user. It may include media items that the content-sharing platform 130 has determined to be of likely interest to the user.

The user interface may also include a comments area 320 that displays comments submitted by users. The comments area 320 may include comments provided through the content-sharing platform 130 and/or comments associated with the media item 304 on the secondary platform 160. For example, a user of the secondary platform 160 may share the media item 304 on the secondary platform 160 with users of the secondary platform 160. Comments made by those users on the secondary platform 160 may be included in the comments area 320 as presented by the content-sharing platform 130. A text-based message created by the user of the secondary platform 160 in connection with the initial sharing of the media item 304 on the secondary platform 160 may also be included in the comments area 320 when the sharing of the media item 304 is accompanied by such a message. These comments may be requested from the secondary platform 160, or a service operating thereon, by the comment integration service 182A of the content-sharing platform 130 as described herein.

Thus, the comment integration service 182A may retrieve comments made by users 322A-E. These users may be users of both the content-sharing platform 130 and the secondary platform 160. In some implementations, each user may have a separate account on both of the platforms 130 and 160 and may have requested to link platforms 130 and 160 to each other. In other implementations, the user may have a single account with an operator of both the platforms 130 and 160. As shown in the comments area 320, the users have made comments 324A-324D. The comments 324A-D may be retrieved from the secondary platform 160 for presentation in the comments area 320 of the user interface 300A as provided to a client device, such as the client device 110A and/or 110B, by the content-sharing platform 130.

To indicate that the comments originated on a platform other than the content-sharing platform 130, which provides the watch UI depicted by user interface 300A, the presentation of comments integrated from another platform may include a comment service indicator 326. The comment service indicator 326 (abbreviated as CSI in FIGS. 3A and 3B) may be an icon that is the same for all comments pulled into the comments area 320 by the comment integration service 182A. Alternatively, the comment service indicator 326 may be an icon and/or message corresponding to the particular service from which the comment originated. Thus, if the user 322A entered comment 324A on a first platform and the user 322B entered the comment 324B on a second platform, the comment service indicators for the comments may be different and reflective of the first platform and the second platform respectively.

As shown in FIG. 3A, the comments 324B, 324C, and 324D each include a URL. The URL in the comment 324B includes a timestamp portion "?t=7m07s" to indicate a certain point in time in a media item identified by "9bZkp7q19f0", the URL in the comment 324B identifies a GIF, and the URL in the comment 324C identifies a playlist and the position of the video in the playlist. Depending on the context of the comments area 320, the comments 324B-D may include redundant information.

Figure 3B:
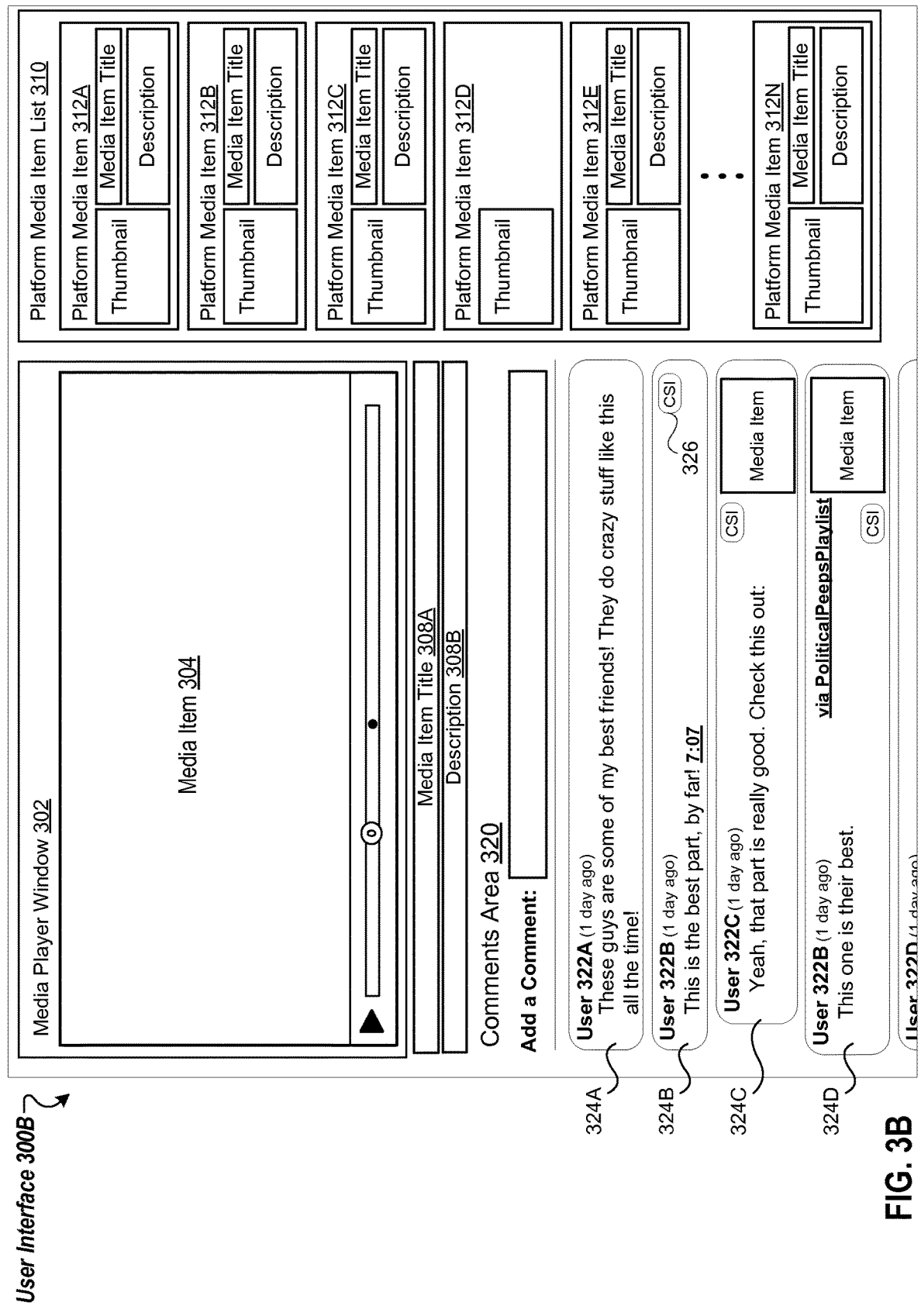
FIG. 3B is another example of a user interface of a content-sharing platform, according to some implementations of the disclosure.

Referring now to FIG. 3B, shown therein is an example of a user interface 300B in which the presentation of the comments 324B-D may be modified to improve the experience of users of the content-sharing platform 130. For example, when the comment is received by the comment integration service 182A (after requesting comments associated with the media item 304 from the secondary platform 160), the comment integration service 182A may determine the context in which the comment is to be rendered to the comments area 320 on a watch UI of the media item 304. The comment integration service 182A may further determine that the URL included in the comment 324B ("http://csp.co/9bZkp7q19f0?t=7m07s") is a URL for the watch UI illustrated in FIG. 3B as user interface 300B. The comment may be modified by the comment integration service 182A from "This is the best part, by far! http://csp.co/9bZkp7q19f0?t=7m07s" to "This is the best part, by far! 7:07" as shown in FIG. 3B. In the comment 324B as modified in FIG. 3B, the converted timestamp portion "7:07" is a link to the media item 304 at 7 minutes and 7 seconds into playback of the media item 304. If the URL in the comment 324B were associated with a media item other than the media item 304, the comment integration service 182A may not modify the presentation of the URL.

Further possible modifications to the presentation of URLs in comments are shown in examples depicted in FIG. 3B. The comment integration service 182A may receive the comment 324C, which includes a URL identifying and/or locating a GIF file. When the GIF file is determined by the comment integration service 182A to be associated with the media item 304, such as by being created from the media item 304, the comment integration service 182A may modify the presentation of the URL by including the GIF file in the comment 324C in place of the URL. Thus, the comment 324C includes the media item 326A in FIG. 3B. The media item 326A may be a GIF file or another type of derivative media file created from the media item 304. The media item 326A may be configured to play automatically when the comment 324C is visible in the user interface 300B. In some implementations, when a user places a cursor over the media item 326A, or otherwise selects the media item 326A, the media item 326A may be shown in a larger window provided in the user interface 300B.

The comment 324D includes a URL that identifies a playlist, a collection of associated media items, of the content-sharing platform 130. When the media item 304 is in the playlist, the comment integration service 182A may modify the presentation of the URL in several ways. The comment integration service 182A may replace the URL with a media item 326B, such as an image, that represents the playlist. For example, the media item 326B may be a composite image that includes multiple images taken from multiple media items of the playlist. Additionally, the comment integration service 182A may replace the URL with a playlist indicator 328 that shows the media item 304 is included in the playlist named "PoliticalPeepsPlaylist." The playlist indicator 328 is illustrated as a text-based indicator "via PoliticalPeepsPlaylist." Upon selection of the playlist indicator 328, the information regarding the playlist may be provided in the user interface 300B. For example, the platform media item list 310 may be refreshed to show a list of media items included in the playlist identified by the URL. Or a new window may appear over the illustrated features of the user interface 300B to depict the playlist identified by the URL.

In other implementations, the presentation of the URL may be modified in different ways according to the context in which the comment including the URL is to be presented and according to the URL. The comment integration service 182A or another service of the content-sharing platform 130 may transmit instructions for the presentation of the modified URL to one or more client devices when the client devices request presentation of the media item 304 from the content-sharing platform 130.

Figure 4:
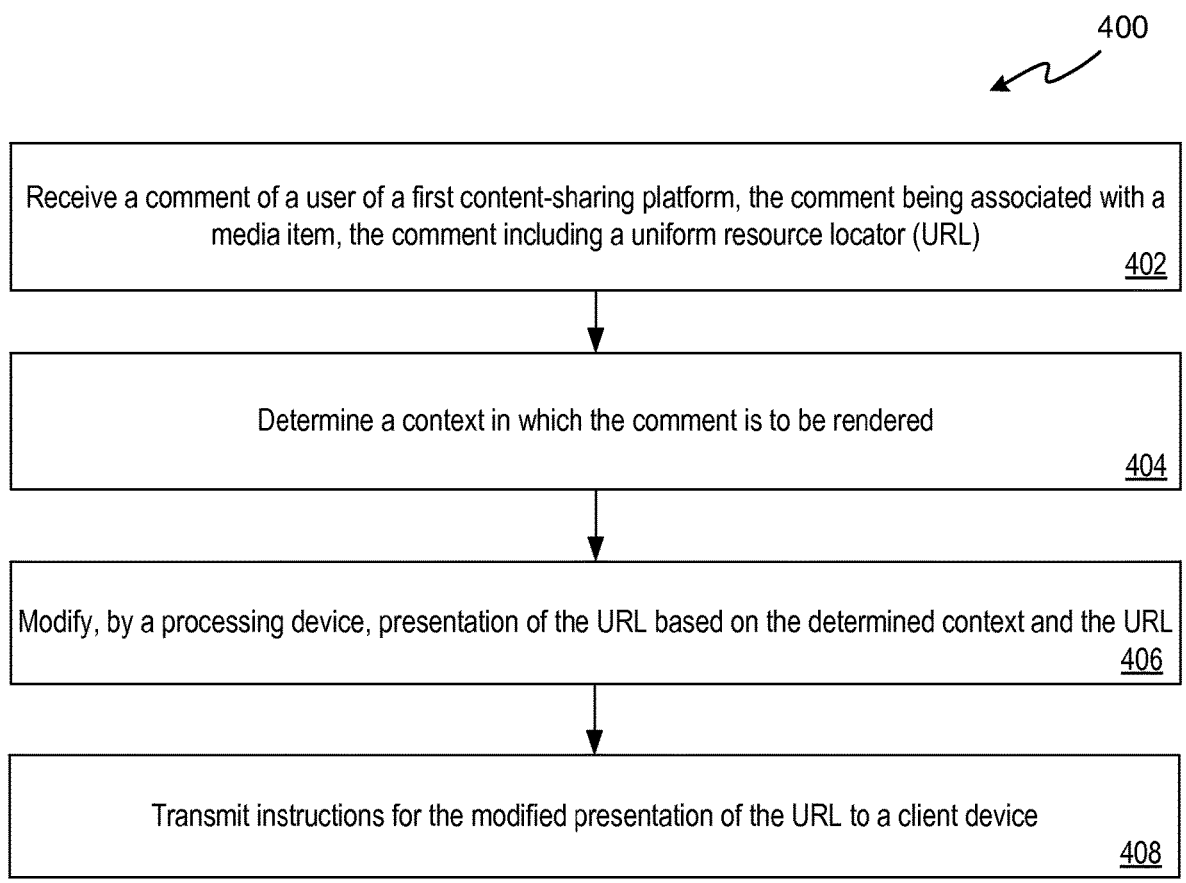
FIG. 4 is a flow diagram of a method of including additional content in a comment, in accordance with some implementations of the disclosure.

FIG. 4 is a flow diagram of a method 400 of modifying URLs in a comment on a content-sharing platform, according to some aspects of the present disclosure. The method 400, and other methods described herein, may be performed by processing logic that comprises hardware (e.g., circuitry, dedicated logic, programmable logic, microcode, etc.), software (e.g., instructions run on a processing device to perform hardware simulation), or a combination thereof. For example, the method 400 may be performed by the content-sharing platform 130 of FIG. 1.

For simplicity of explanation, the method 400 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

In one implementation, method 400 may be performed by the comment integration service 182A of the content-sharing platform 130 as shown in FIG. 1. In some implementations, one or more of the operations of the method 400 may be performed by other features of the content-sharing platform 130.

Implementations of the method 400 may begin at block 402 in which processing logic receives a comment of a user of a first content-sharing platform. The comment may be associated with a media item and may include a uniform resource locator (a URL). The comment may be received as part of a set of comments. For example, the comment integration service 182A may request any comments associated with a specific media item from the secondary platform 160. The comment may include a URL such as "http://csp.co/9bZkp7q19f0?t=7m07s" which may be a URL to access a media item at a particular time in its playback (i.e., 7 minutes and 7 seconds in).

At block 404, the processing logic may determine a context in which the comment is to be rendered. For example, the content-sharing platform 130 may determine that the comment is to be displayed on a watch UI for a media item with which the comment is associated and with which the URL in the comment is associated. The comment may be included in the comments area of a user interface for presenting the media item, such as the comments area 320 of FIGS. 3A and 3B.

At block 406, the processing logic may modify the presentation of the URL. The processing logic may modifying the presentation based on or in view of the determined context in which the comment is to be rendered (e.g., whether or not the comment includes a URL associated with the media item being presented on the page in which the comment is to appear). The processing logic may determine the types of information included in the URL. For example, a URL may include information identifying a media item, a derivative media item, a playlist, and/or a timestamp, etc. The processing logic may modify the presentation of the URL based on the URL itself. For example, the comment integration service 182A may modify the URL "http://csp.co/9bZkp7q19f0?t=7m07s" to be presented as a link appearing as "7:07." Thus, the information "?t=7m07s" may be reformatted for presentation in a time presentation format as appropriate given the length of the media item in connection with which the comment is to be rendered. Different modifications may be implemented by the content-sharing platform 130 in other implementations, some of which are described herein.

At block 408, instructions for the modified presentation of the URL may be transmitted to a client device, which may then render the comment to a display of the client device. The instructions may be transmitted to the client device as part of a set of instructions or data to be rendered by the client device. The set of instructions may include instructions for providing one or more user interfaces, like user interfaces 300A or 300B, streamed media information, etc., such as may be sent by the content-sharing platform 130 to enable users to upload, consume, or generate media items and to facilitate communication among users of the content-sharing platform. For example, the instructions may include HTML files and other formatted data or instructions.

Figure 5:
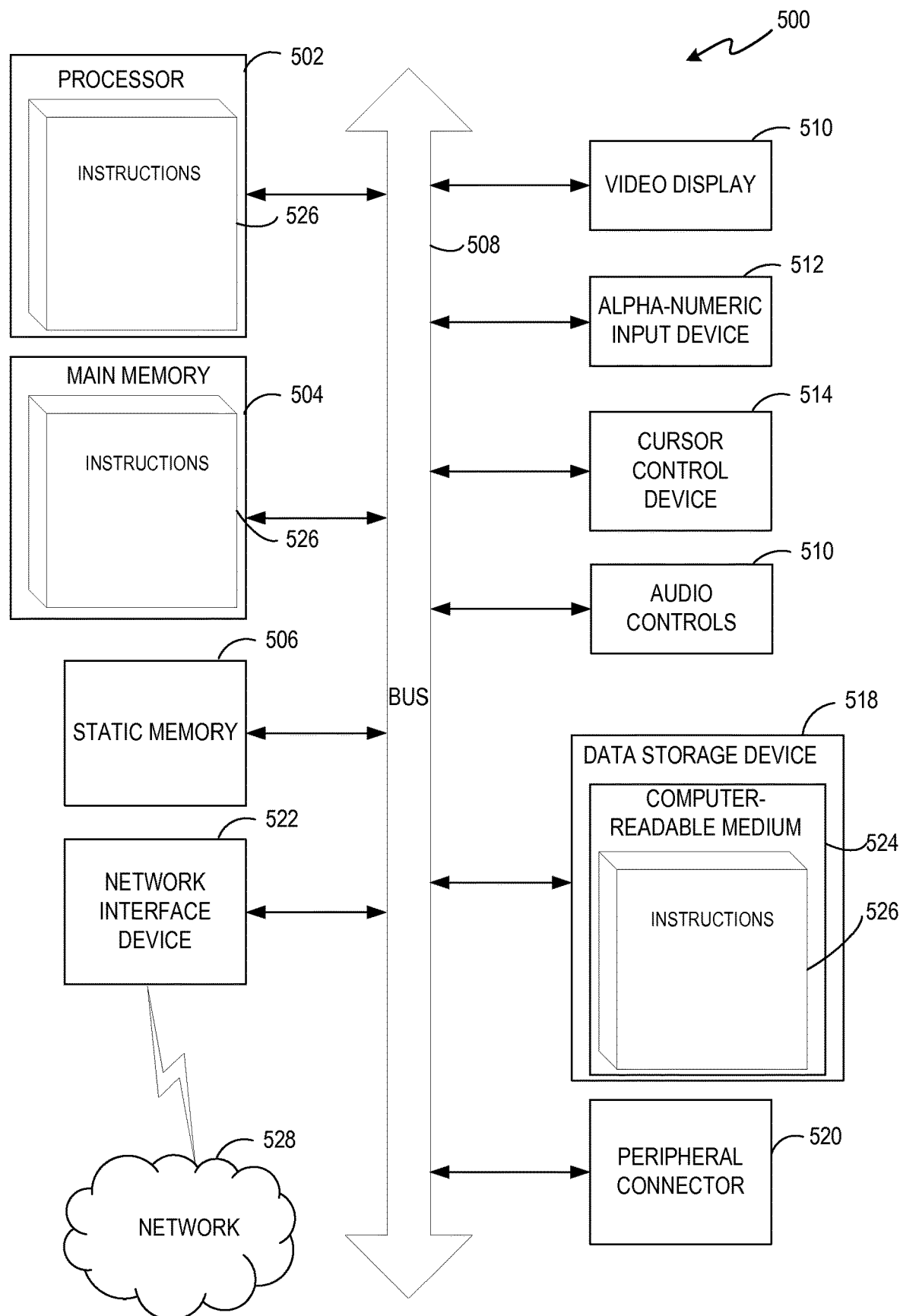
FIG. 5 is a block diagram illustrating an example of a system architecture, according to some implementations of the disclosure.

FIG. 5 illustrates a diagrammatic representation of a machine implemented in the form of a computer system 500 within which a set of instructions or sets of instructions, for causing the machine to perform any one or more of the methodologies discussed herein, may be executed. In alternative implementation, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example depicted by computer system 500 includes a processing device (or processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like, having one or more cores. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein. For example, the processor 502 may execute instructions 526 to perform method 400 as shown herein in FIG. 4 and as described in connection with FIGS. 1-3B. In some implementations, the processor 502 may execute the instructions 526 to provide the comment integration service 182A or 182B as seen in FIG. 1 and the comment integration system 200 as seen in FIG. 2, as well as subsystems and components thereof.

The computer system 500 may further include a network interface device 522. The network interface device 522 may include a plurality of network interface components, with each components being adapted for different modes of communication. For example, the network interface components may include an 802.11 transceiver, a Bluetooth® transceiver, and an interface for communicating with one or more cellular networks. The computer system 500 also may include a video display unit 510 (e.g., a liquid crystal display (LCD), a cathode ray tube (CRT), or a touch screen), an alphanumeric input device 512 (e.g., a physical keyboard or a virtual keyboard), a cursor control device 514 (e.g., a mouse or touch-screen sensor system), and a signal generation device 520 (e.g., a speaker). While not depicted in FIG. 5, the computer system 500 may include a variety of sensors, such as ambient light sensors, motion sensors, microphones, temperature and pressure sensors, and cameras.

The data storage device 518 may include a non-transitory computer-readable storage medium 524 on which is stored one or more sets of instructions 526 (e.g., software) embodying any one or more of the services, methodologies, or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 528 via the network interface device 522.

In one implementation, the instructions 526 include instructions for providing media item storage, a user service, a comment integration service, a media viewer or other features which may correspond, respectively, to identically-named counterparts described with respect to FIGS. 1 and 2, and/or a software library containing methods for modifying the presentation of URLs in comments. While the computer-readable storage medium 524 is shown in an example as implemented to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "modifying", "determining", "receiving", "identifying", "generating", "maintaining", "transmitting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
   receiving a comment of a user of a first content-sharing platform, wherein the comment has originated on the first content-sharing platform, is associated with a media item, and includes a uniform resource locator (URL);
   determining a comment thread in which the comment originated on the first content-sharing platform is to be rendered on a second content-sharing platform; and
   causing, by a processing device, presentation, on the second content-sharing platform, of the URL to be modified and included in the comment originated on the first content-sharing platform, wherein causing the presentation of the URL to be modified comprises:
   determining whether information in the URL is redundant in view of the comment thread in which the comment originated on the first content-sharing platform is to be rendered, and responsive to determining that the information in the URL is redundant, causing the redundant information to be removed from the URL;
   determining whether the URL includes a timestamp portion, and responsive to determining that the URL includes the timestamp portion, causing the timestamp portion of the URL to be converted into a time presentation format and
   determining whether the URL identifies a derivative media file, and responsive to determining that the URL identifies the derivative media file, causing the URL to be replaced with an image associated with the derivative media file,
   wherein instructions associated with a resulting modified presentation of the URL are provided to a client device.

2. The method of claim 1, wherein the media item is hosted on the second content-sharing platform.

3. The method of claim 1, further comprising requesting the comment from the first content-sharing platform.

4. The method of claim 1, wherein determining the comment thread in which the comment is to be rendered comprises determining whether the comment is to be rendered in a comment thread on a watch user interface (UI) of the media item on the second content-sharing platform.

5. The method of claim 1, wherein the image associated with the derivative media file is a thumbnail image associated with the derivative media file.

6. A system comprising:
   a memory to store instructions thereon; and
   a processing device communicably coupled to the memory, the processing device to execute the instructions to:
   receive a comment of a user of a first content-sharing platform, wherein the comment has originated on the first content-sharing platform, is associated with a media item, and includes a uniform resource locator (URL);
   determine a comment thread in which the comment originated on the first content-sharing platform is to be rendered on a second content-sharing platform; and
   cause presentation, on the second content-sharing platform, of the URL to be modified and included in the comment originated on the first content-sharing platform to, wherein to cause the presentation of the URL to be modified, the processing device is to:
   determine whether information in the URL is redundant in view of the comment thread in which the comment originated on the first content-sharing platform is to be rendered, and responsive to determining that the information in the URL is redundant, cause the redundant information to be removed from the URL;
   determine whether the URL includes a timestamp portion, and responsive to determining that the URL includes the timestamp portion, cause the timestamp portion of the URL to be converted into a time presentation format; and
   determine whether the URL identifies a derivative media file, and responsive to determining that the URL identifies the derivative media file, cause the URL to be replaced with an image associated with the derivative media file,
   wherein instructions associated with a resulting modified presentation of the URL are provided to a client device.

7. The system of claim 6, wherein the comment thread in which the comment is to be rendered is a comment thread on a watch user interface (UI) of the second content-sharing platform.

8. The system of claim 7, wherein the media item is hosted on the second content-sharing platform.

9. The system of claim 6, wherein the instructions to determine the comment thread in which the comment is to be rendered comprise instructions to determine whether the comment is to be rendered in a comment thread on a watch user interface (UI) of the media item.

10. The system of claim 6, wherein the image associated with the derivative media file is a thumbnail image associated with the derivative media file.

11. A non-transitory computer-readable storage medium storing instructions that, when executed by a processing device, cause the processing device to perform operations comprising:

receiving a comment of a user of a first content-sharing platform, wherein the comment has originated on the first content-sharing platform, is associated with a media item, and includes a uniform resource locator (URL);

determining a comment thread in which the comment originated on the first content-sharing platform is to be rendered on a second content-sharing platform; and causing presentation, on the second content-sharing platform, of the URL of the URL to be modified and included in the comment originated on the first content-sharing platform, wherein causing the presentation of the URL to be modified comprises:

determining whether information in the URL is redundant in view of the comment thread in which the comment originated on the first content-sharing platform is to be rendered, and responsive to determining that the information in the URL is redundant, causing the redundant information to be removed from the URL;

determining whether the URL includes a timestamp portion, and responsive to determining that the URL includes the timestamp portion, causing the timestamp portion of the URL to be converted into a time presentation format; and determining whether the URL identifies a derivative media file, and responsive to determining that the URL identifies the derivative media file, causing the URL to be replaced with an image associated with the derivative media file, wherein instructions associated with a resulting modified presentation of the URL are provided to a client device.

12. The non-transitory computer-readable storage medium of claim 11, wherein determining the comment thread in which the comment is to be rendered comprises determining whether the comment is to be rendered in a comment thread on a watch user interface (UI) of the media item.

13. The non-transitory computer-readable storage medium of claim 11, wherein the image associated with the derivative media file a thumbnail image associated with the derivative media file.

* * * * *